Figure 1:
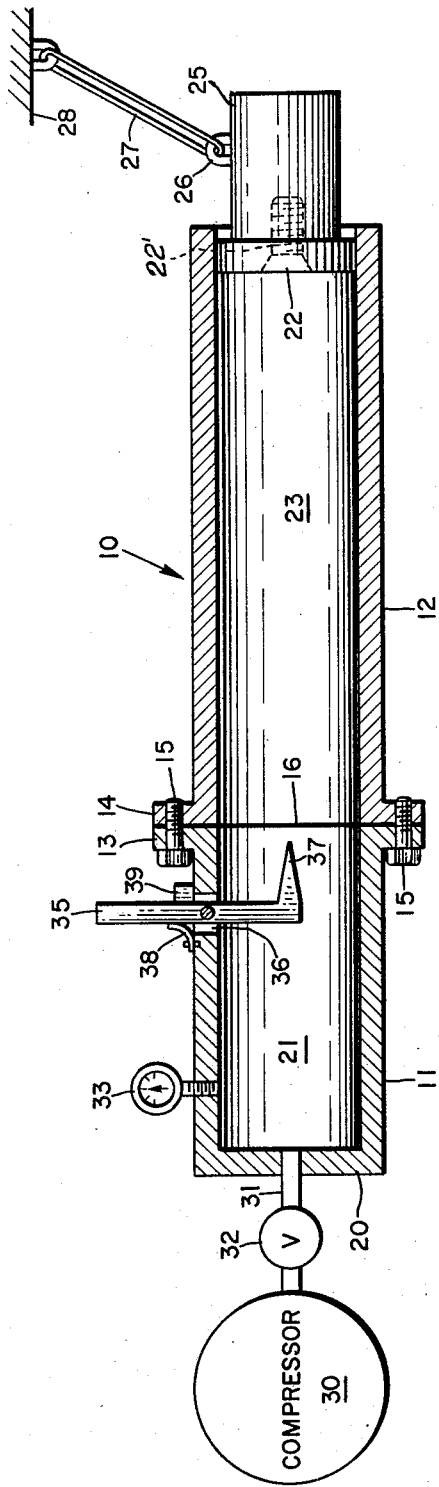

Feb. 25, 1958     T. E. HANES     2,824,444

DEVICE FOR PRODUCING MECHANICAL SHOCKS

Filed June 29, 1955

*INVENTOR.*
THOMAS E. HANES

BY

*George S. Rubens*
ATTORNEYS

United States Patent Office 2,824,444
Patented Feb. 25, 1958

2,824,444

DEVICE FOR PRODUCING MECHANICAL SHOCKS

Thomas E. Hanes, Ventura, Calif., assignor to the United States of America as represented by the Secretary of the Navy Application June 29, 1955, Serial No. 519,009

4 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

The present invention relates to a device for producing high acceleration mechanical shocks and more particularly to a new and novel device for producing high acceleration mechanical shocks utilizing an arrangement wherein an elongated body means is divided into two closed chambers by a frangible diaphragm such that when the diaphragm is ruptured, a shock wave is produced which impinges upon a driven member connected to a test object.

In order to test the effects of shock and vibration on various objects such as electronic, optical and other sensitive equipment utilized in modern day aircraft and guided missiles, it is necessary to provide a test mechanism which can set up vibrations and produce shocks which the equipment may be subjected to in normal usage. The major problems involved in the missile field, for example, are those of being able to accurately reproduce the same shock each time with a given piece of test equipment and to excite the object to be tested such that high frequency vibrations may be developed in order to determine the resonant characteristics of the tested objects.

Numerous devices have been designed in the prior art to accomplish the aforementioned results and the most satisfactory type of device now known is of the type shown for example in U. S. Patent #2,537,096. In devices of this type, compressed air is built up behind a piston until a frangible diaphragm restraining the piston ruptures, whereupon the piston travels down an elongated tube under the influence of the compressed gas. The test object is connected by a suitable means directly to the piston.

In order to excite high frequency vibrations in the test object, it is necessary to provide a high rate of acceleration to the test object. In devices as shown in the aforementioned patent, the rate of acceleration is limited by the finite time required for the restraining diaphragm to rupture. The ideal case would be one in which the diaphragm would rupture instantaneously and the full gas force applied to the piston. However, due to the rupturing characteristic of such a diaphragm, the force is applied over a finite time such that force of the gas pressure is applied gradually rather than instantaneously to the piston.

The present invention provides an arrangement whereby an elongated body means is divided by a frangible diaphragm into a compression and an expansion chamber. A driven member closes one end of the expansion chamber opposite the end closed by the diaphragm, and the test object is mechanically connected to the driven member. Means is provided for building up a predetermined pressure within the compression chamber and a means is provided for selectively rupturing the diaphragm. Upon rupture of the diaphragm, a shock wave travels through the expansion chamber and after a certain distance of travel along the chamber, the wave front of the shock wave forms such that there is a pressure discontinuity thereat, or in other words, the pressure rises from the initial pressure in the expansion chamber to an extremely high pressure behind the shock wave in a very small increment of distance longitudinally along the chamber.

In this manner, the force of the gas pressure is applied to the driven member as a shock wave, and accordingly the time in which the full force of the gas pressure is applied to the driven member is extremely small. The time in which it takes to apply the full gas pressure in the invention device is conservatively 100 times less than that required to apply the full gas pressure to the driven member in the aforementioned patent. Since acceleration is an inverse function of time, it is apparent that the rate of acceleration of the test object in the present invention is considerably greater than that in the aforementioned patent, and consequently the results obtainable therewith are far superior to those of the prior art, and in fact, frequencies may be produced with the invention device which cannot possibly be accurately produced by known devices.

The invention device provides an arrangement wherein the results may be continually reproduced with great accuracy, and extremely high frequency vibrations may be developed in the test object in order to determine the resonant characteristics of a given test object.

An object of the present invention is the provision of a new and novel device for producing high acceleration mechanical shocks wherein a mechanical shock of a given amplitude may be accurately reproduced in successive operations.

Another object is to provide a device for producing high acceleration mechanical shocks which is adapted to produce a high rate of acceleration in a test object thereby setting up very high frequencies of vibration in the test object.

A further object is to provide a device for producing high acceleration mechanical shock which is simple and inexpensive in construction, yet rugged and reliable in operation.

Figure 2:
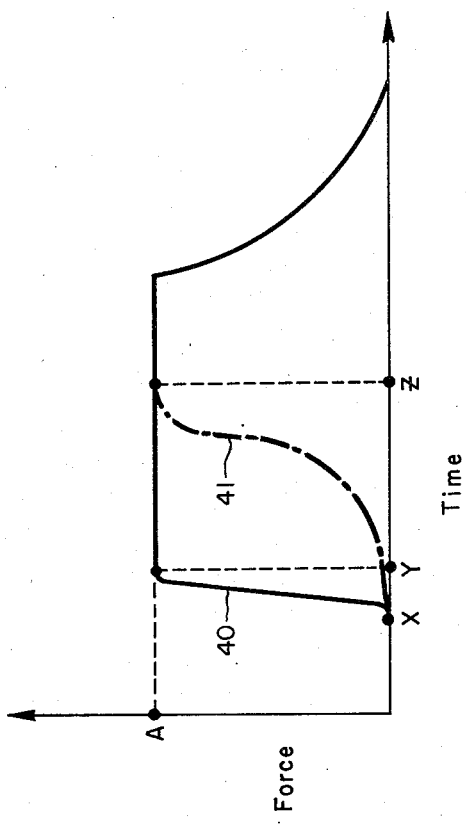

Other objects and many of the attendant advantages of this invention will be readily appreciated as the same becomes better understood by reference to the following detailed description when considered in connection with the accompanying drawings wherein:

Fig. 1 is a somewhat schematic view of the invention device shown partly in cross section, and Fig. 2 is a graph illustrating the force-time characteristic of the invention device and also a prior art device such as shown in the aforementioned patent.

Referring now to the drawings, there is shown in Fig. 1 an elongated body means indicated generally by reference numeral 10 comprising a first hollow cylindrical member 11 and a second hollow cylindrical member 12 each of which has radially extending flanges 13 and 14 respectively about the outer periphery thereof at one end of each of the two members. Flanges 13 and 14 are secured to one another by means of bolts 15 which extend through aligned openings extending therethrough, and a circular diaphragm 16 is clamped between the opposite faces of the flanges. Diaphragm 16 is comprised of a suitable frangible material such as X-ray film or the like which is quite strong and adapted to withstand high gaseous pressures, yet which may be easily ruptured in such a manner that the entire diaphragm ruptures rapidly and completely, offering practically no restriction between the interiors of members 11 and 12.

An end wall 20 closes one end of member 11 such that an enclosed chamber 21 is defined within member 11 between wall 20 and diaphragm 16. A driven member shown as a piston 22 is mounted within the outer end of member 12 and has a rather loose fit within the bore of member 12, it being apparent that an enclosed chamber 23 is defined within member 12 between piston 22 and diaphragm 16. A test object 25, which may comprise for example a piece of electronic equipment, is suitably secured to the outer surface of the piston by suitable means, such as screw 22', or it may merely rest against the piston as long as it is in close mechanical contact with the piston prior to energization of the device. The test object is provided with a bracket 26 which is connected to a rope or wire 27 pivotally suspended from a suitable overhead support member 28 such that upon the piston's being actuated in an outward direction, the test object will travel in an arc about the pivot point of member 27. This arrangement prevents the test object from falling on a hard surface and injuring the components thereof. It is evident that the test object may also be mounted, for example, on small tracks such that it may travel outwardly without damage thereto, and various other arrangements will be apparent to those skilled in the art. It should be noted that the piston is initially positioned substantially at the end of cylinder 12 but may extend a few inches therein if desired, although this is not a critical factor.

A source of gas pressure such as a compressor 30 is connected by means of a conduit 31 to compression chamber 21, a manually operable valve 32 being connected in conduit 31 for controlling the flow of gas into the compression chamber. A conventional pressure gauge 33 is connected in a well known manner to the interior of the compression chamber such that an operator may have an accurate indication of the pressure within the chamber.

A rupturing means for rupturing diaphragm 16 comprises a lever 35 which is pivotally mounted on cylinder 11 and extends through a slot 36 in cylinder 11 into the compression chamber, a suitable seal (not shown) being provided for preventing the escape of gas from the chamber. The inner end of lever 35 has a normally extending cutting portion 37 which has a sharpened outer end adapted to engage diaphragm 16. A small leaf spring 38 is secured to the outer surface of cylinder 11 and engages lever 35 thereby normally urging it against a stop member 39 fixed to the outer surface of cylinder 11. In this manner, cutting portion 36 of the rupturing means is normally urged out of engagement with diaphragm 16.

Operation of the device is as follows:

Flanges 13 and 14 are initially disconnected from one another and frangible diaphragm 16 is clamped between the flanges, whereupon bolts 15 are inserted through the openings in the flange and drawn up tight such that the flanges are sealed with respect to one another. A test object is suitably secured to piston 22 and the piston is inserted in the outer end of chamber 12, the test object being suitably suspended by a rope or wire 27.

The peak value of the force applied to the piston is a function of the initial pressure in compression chamber 21, and consequently the force applied to the piston may be adjusted by controlling the pressure within this chamber. The operator therefore adjusts the pressure within chamber 21 by means of valve 32 to a predetermined desired value, whereupon lever 35 is rotated in a counterclockwise direction as seen in Fig. 1 such that cutting portion 36 engages and ruptures diaphragm 16. The diaphragm ruptures almost instantaneously and completely such that there is practically no obstruction to gas flow between chambers 21 and 23. The gas under pressure in chamber 21 then travels through chamber 23 and during its travel therethrough forms a shock wave in a well-known manner such that when the shock wave reaches piston 22, the force of the gas pressure is applied to the piston in an extremely short period of time creating a rapid rate of acceleration and exciting high frequencies in the test object. The test object and the piston are then expelled from the outer end of cylinder 12 and the test object will remain suspended by rope or wire 27.

Fig. 2 shows a graph illustrating the force-time relationship of the impulse applied to the piston in the invention device. Assuming that the shock wave engages the piston at an initial time X, solid line 40 indicates that the force rises to the peak value A at a time Y, the major portion of the elapsed time X—Y being due to the elastic characteristic of the piston. It is evident that the force rises to the peak value almost instantaneously, and in this manner extremely high frequencies are excited in the test object. In contrast, broken line 41 indicates generally the force time characteristic of a device as shown in U. S. Patent #2,537,096 wherein the force rises much more gradually due to the finite time required to rupture the frangible diaphragm of the device. The time X—Z required to reach the peak value in prior art devices is not shown to scale in the graph, but as pointed out previously is conservatively at least 100 times as great as the time X—Y. It is therefore apparent that the invention device provides an improved result over that of prior art devices thereby enabling the testing of equipment at high frequencies not previously obtainable.

The time duration of the peak force applied to the test object is determined by the dimensions of the compression and expansion chambers 21 and 23 and also somewhat by the pressures in these chambers prior to rupture of the diaphragm in accordance with well-known design considerations. The peak value of the force applied to the test object is controlled by adjusting the initial pressure in the compression chamber 21 prior to rupture of diaphragm 16. It is accordingly apparent that the force-time characteristic of the mechanical shock applied to the test object can be accurately controlled and reproduced by adjusting the dimensions of chambers 21 and 23 and the gas pressure therein.

The driven member may comprise a flexible diaphragm or bellows instead of a piston if desired, and in such a case, a suitable means must be provided to prevent excessive movement of the diaphragm or bellows such that it is not deformed when subjected to the shock wave.

It is apparent from the foregoing that there is provided a new and novel device for producing high acceleration mechanical shocks wherein the mechanical shock may be accurately controlled and reproduced and very high frequencies may be excited in a test object. The device is also simple and inexpensive in construction, yet rugged and reliable in operation.

Obviously many modifications and variations of the present invention are possible in the light of the above teachings. It is therefore to be understood that within the scope of the appended claims the invention may be practiced otherwise than as specifically described.

I claim:

1. A device for producing high acceleration mechanical shocks which comprises an elongated hollow body means, means for closing one end of said body means, a frangible member mounted within said body member and dividing the interior of said body means into a compression chamber and an expansion chamber, means for rupturing said frangible member, means for introducing a gaseous fluid under pressure into said compression chamber, and a driven member movably mounted within said expansion chamber, means for supporting a test object for engagement by said driven member, said driven member being spaced from said frangible member sufficiently to permit the formation of a pneumatic shock wave when the frangible member is ruptured whereby said driven member is subject to a mechanical shock created by said shock wave.

2. A device for producing high acceleration mechanical shocks which comprises a hollow cylinder, a wall closing one end of said cylinder and a movable driven member closing the opposite end of said cylinder, said driven member adapted to be in contact with a test object, a frangible diaphragm extending transversely across the interior of said cylinder thereby defining a pressure chamber between one side of said diaphragm and said wall and an expansion chamber between the opposite side of said diaphragm and said driven member, means for introducing a gaseous fluid under pressure into said first chamber, means for measuring the fluid pressure in said first chamber, and means for rupturing said diaphragm, said expansion chamber being so dimensioned as to permit the formation of a shock wave when the diaphragm is ruptured whereby said test object is subjected to a mechanical shock created by said shock wave.

3. A device as defined in claim 2 wherein said last-mentioned means comprises a member movably mounted on said cylinder and having a cutting end portion extending into said compression chamber and adapted to engage said diaphragm, and means normally biasing said cutting end portion out of engagement with said diaphragm.

4. A device for producing high acceleration mechanical shocks which comprises a body means including first and second hollow cylinders forming a compression chamber and an expansion chamber respectively, each of said cylinders having a circumferential flange extending about one end thereof, said flanges being juxtaposed with one another and having a frangible diaphragm clamped therebetween, a wall closing the opposite end of said first cylinder and a movable driven member closing the opposite end of said second cylinder, said driven member adapted to be in contact with a test object, means for introducing a gaseous fluid under pressure into said first chamber, means for measuring the fluid pressure in said first chamber, and means movably mounted on said body means for rupturing said diaphragm, said rupturing means having a cutting end portion extending into the interior of said first cylinder and adapted to engage said diaphragm, and resilient means normally biasing said cutting end portion out of engagement with said diaphragm, said expansion chamber being so dimensioned as to permit the formation of a shock wave when the diaphragm is ruptured whereby said test object is subjected to a mechanical shock created by said shock wave.

References Cited in the file of this patent

UNITED STATES PATENTS

| | | |
|---|---|---|
| 279,538 | Chamberlain | June 19, 1883 |
| 2,474,235 | Dresser et al. | June 28, 1949 |
| 2,537,096 | Shreeve et al. | Jan. 9, 1951 |
| 2,574,475 | Grogan | Nov. 13, 1951 |
| 2,618,963 | Wagenhals | Nov. 25, 1952 |